United States Patent
Ogawa

(10) Patent No.: US 7,623,327 B2
(45) Date of Patent: Nov. 24, 2009

(54) MOTOR PROTECTIVE DEVICE

(75) Inventor: Sumitaka Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 11/723,715

(22) Filed: Mar. 21, 2007

(65) Prior Publication Data

US 2007/0242398 A1 Oct. 18, 2007

(30) Foreign Application Priority Data

Mar. 22, 2006 (JP) ............................. 2006-079185

(51) Int. Cl.
*H02H 5/04* (2006.01)
(52) U.S. Cl. ..................... 361/25; 361/31; 318/432; 318/434; 701/41; 701/42
(58) Field of Classification Search ............. 701/41–43; 361/25, 27, 31
See application file for complete search history.

(56) References Cited

U.S. PATENT DOCUMENTS

| | | | | |
|---|---|---|---|---|
| 4,771,843 A * | 9/1988 | Shimizu | ...................... | 180/446 |
| 6,321,695 B1 * | 11/2001 | Yoo et al. | ................. | 123/41.15 |
| 6,876,606 B2 * | 4/2005 | Kajino et al. | ............. | 369/44.27 |
| 7,091,686 B2 * | 8/2006 | Kagei | .......................... | 318/434 |
| 7,203,583 B2 * | 4/2007 | Fujimoto et al. | ............... | 701/41 |
| 2004/0194466 A1 * | 10/2004 | Kawamura et al. | ............ | 60/612 |
| 2006/0260304 A1 * | 11/2006 | Ishiwatari | ..................... | 60/599 |

FOREIGN PATENT DOCUMENTS

JP 2005-324796 A 11/2005

* cited by examiner

*Primary Examiner*—Rita Leykin
(74) *Attorney, Agent, or Firm*—Birch, Stewart, Kolasch & Birch, LLP

(57) ABSTRACT

A heating value calculation part obtains a substantial heating value based on the difference between a heating value and a radiating value attributed to a motor supply current. The radiating value is obtained by a difference between a motor estimation temperature Td and an ambient temperature Tm. The heating value is cumulated in the heating value calculation part and the cumulated value is inputted to a cumulated buffer. A cumulated value TS which is obtained by adding an initial temperature T0 to the cumulated value Td is inputted to a target current value ratio map and a target current value upper limit map. One of the target current values is selected and the selected target current value is inputted to a current feedback control part. The current feedback control part controls a motor output part such that the motor supply current is converged to the target current value.

12 Claims, 5 Drawing Sheets

MOTOR PROTECTIVE DEVICE

CROSS-REFERENCE TO RELATED APPLICATIONS

The present application claims priority under 35 USC 119 to Japanese Patent Application No. 2006-079185 filed on Mar. 22, 2006 the entire contents of which are hereby incorporated by reference.

BACKGROUND OF THE INVENTION

1. Field of the Invention

The present invention relates to a motor protective device, and more particularly to a motor protective device which protects a motor used for electrically-operated power steering, for example, by making use of a motor overheat prevention function.

2. Description of Background Art

With respect to the steering of a vehicle by rotating a steering shaft, an electrically-operated power steering system is known which eases the steering by imparting a rotational auxiliary force to the steering shaft by using an electrically-operated motor.

In JP-A-2005-324796, a control device is disclosed wherein an electrically-operated power steering device is provided for preventing the overheating of the electrically-operated motor. The electrically-operated power steering device estimates a temperature of the wiring of a motor and performs a motor temperature protective control based on the estimated temperature.

In general, in estimating the wiring temperature of the motor, a current value which flows in the wiring and a resistance value of the wiring are used in accordance with Joule's Law. More specifically, assuming the current value is I, the resistance value is R and an electricity supply time is t, a heating value Q can be estimated by a following formula (1).

$$Q = I \times I \times R \times t \qquad (1)$$

Although the heating value is estimated based on this formula (1), to further enable the estimation of the temperature, it is necessary to take also a radiating value into consideration. A following formula (2) is a heating value estimation formula which contains a constant a as a radiating value correction term. A cumulative value T represents a temperature.

$$\text{Cumulative value } T = \Sigma(K \times I \times I - a) \qquad (2)$$

This formula (2) is an estimation formula for estimating the temperature by cumulating the heating value when the power steering is operated and the electricity is supplied to the electrically-operated motor for an electricity supply time, wherein the constant a is subtracted as the radiating value. The constant a in the formula (2) is, to ensure the temperature protection by estimating a high temperature, set to an extremely small value such that the cumulative value returns to zero with a time longer than a time that the temperature of the wiring returns to a normal temperature when the supply of electricity is stopped from the maximum temperature. When the constant a is set to an excessively large value, the cumulative value T tends to be decreased thus facilitating the estimation of the wiring temperature at a low value. When the supply of electricity is not performed for a long time, the cumulative value T returns to zero due to the constant a. Here, in the formula (2), a coefficient K is a cumulating coefficient and is a numerical value obtained by an experiment carried out preliminarily so as to approximate a calculated value to an actually measured value.

With the use of the above-mentioned formula (2), the temperature of the electrically-operated motor can be estimated without using the temperature sensor and it is possible to protect the electrically-operated motor by stopping the supply of electricity to the electrically-operated motor when the estimated temperature becomes the preset temperature or more.

Although the above-mentioned formula (2) is suitable for a vehicle which exclusively travel on a paved general road, the formula (2) is not always suitable for an all terrain vehicle (ATV) which travels on an off-road or the like. In the off-road traveling, a load on power steering is large and the frequency of the supply of electricity to the electrically-operated motor is increased. Thus, the cumulative value T becomes excessive. In an actual operation, there may be a possibility that the supply of electricity to the electrically-operated motor is stopped at a low temperature which requires no protection for generation of heat and the auxiliary force is not imparted to the steering shaft.

The reason that the cumulative value T becomes excessive and is no longer correlated with the actual temperature is as follows. More specifically, although the constant a for correction which is decided by taking the radiating value into consideration is an extremely small fixed value, the actual radiating value is changed due to the difference between the temperature of the electrically-operated motor and the ambient temperature. When the motor is operated for a long time, the temperature difference becomes large. Thus, the radiating value is increased whereby the actual temperature of the electrically-operated motor is elevated to a small extent. Accordingly, when the formula (2) in which the constant a takes the extremely small value is adopted, the cumulative value of the heating value tends to be increased and it is considered impossible to take a correlation between the cumulative value T and the actual temperature.

SUMMARY AND OBJECTS OF THE INVENTION

Accordingly, it is an object of an embodiment of the present invention to provide a motor protective device which can prevent overheat of an electrically-operated motor by accurately estimating a temperature of the motor in a power steering device or the like which may be used in a traveling condition in which the device is frequently used.

The invention which can overcome the above-mentioned problem is, in a motor protective device which includes a motor, a motor driver which controls an electric current supplied to the motor, a temperature estimation means which estimates a temperature of the motor based on the electric current supplied to the motor, and an overheating protective means which limits an upper limit of the motor supply current in response to the estimated temperature of the motor.

The temperature estimation means includes a heating value cumulative means which cumulates the difference between a heating value and a radiating value of the motor attributed to the supply current along with a lapse of time and, at the same time, the radiating value is a function of the difference between a heating-value cumulative value calculated by the heating value cumulative means and an ambient temperature.

Further, according to an embodiment of the present invention the heating value is calculated as a multiplied value of the motor supply current value and a preset heating coefficient and, at the same time, the radiating value is calculated as a multiplied value of the difference between the heating-value cumulative value and an ambient temperature and a preset radiating coefficient. The heating coefficient and the radiating coefficient are set such that the heating-value cumulative value becomes higher than an actually measured temperature of the motor which is measured preliminarily.

Further, according to an embodiment of the present invention the ambient temperature is a preset fixed value.

Further, according to an embodiment of the present invention the ambient temperature is set as a function of the heating-value cumulative value which is obtained by cumulating the difference between the heating value and the radiating value of the motor along with a lapse of time. In addition, a second heating coefficient and a second radiating coefficient are multiplied to the heating value and the radiating value apart from the heating coefficient and the radiating coefficient.

Further, according to an embodiment of the present invention the radiating value of the motor is a preset fixed value in setting the ambient temperature.

Further, according to an embodiment of the present invention the present invention may be applicable to the prevention of the overheating of a motor for an electrically-operated power steering device.

According to an embodiment of the present invention, it is possible to estimate the temperature of the motor without using the temperature sensor based on the difference between the heating value and the radiating value attributed to the supply current to the motor. Thus, the number of parts can be reduced. Further, the radiating value is not set as a fixed value and is obtained based on the difference between the heating value and the ambient temperature. Thus, it is possible to accurately estimate the temperature of the motor in a state wherein the motor is frequently started and stopped.

According to an embodiment of the present invention, with the use of the heating coefficient and the radiating coefficient which are set to make the estimation temperature higher than the actually measured temperature of the motor, the estimated temperature of the motor is calculated to a slightly higher value. Accordingly, even when a load of the power steering becomes large, the supply current to the motor is limited before overheat of the motor.

According to an embodiment of the present invention, since the ambient temperature is set as the fixed value, an arithmetic operation processing can be simplified. When the motor is arranged in an ambient environment which exhibits the favorable heat radiating property, it is unnecessary to consider an influence of a heat mass. Thus, the ambient temperature may be set as a fixed value.

According to an embodiment of the present invention, since the ambient temperature can be changed by taking the heating value and the radiating value of the motor into consideration, in a layout in which the surrounding of the motor is closed and the influence of a heat mass is large, it is possible to accurately estimate the temperature of the motor thus realizing the effective overheat protection.

According to an embodiment of the present invention, the radiating value is set as the fixed value. Thus, in a layout in which the influence of a heat mass is small, it is possible to accurately estimate the temperature of the motor without increasing a burden imposed on arithmetic operation processing.

According to an embodiment of the present invention, in a traveling state in which the power steering is frequently operated, the temperature of the motor for the power steering device can be accurately estimated so as to prevent the motor from overheat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
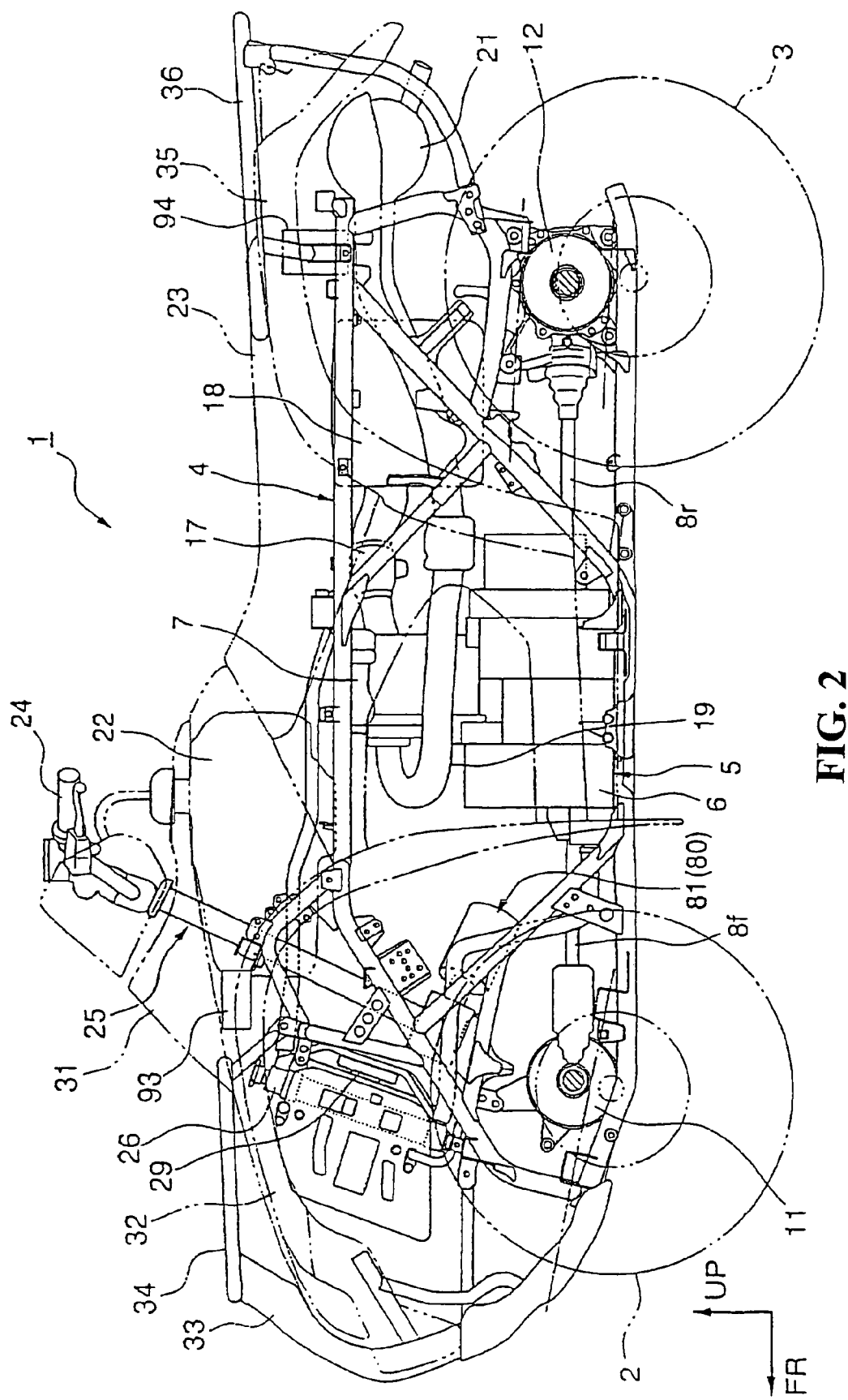
FIG. 2 is a left side view of a saddle-type vehicle in which the electrically-operated power steering control device of the present invention is incorporated.

Hereinafter, one embodiment of the present invention is explained in conjunction with drawings. FIG. 2 is a left side view of a saddle-ride type vehicle in which a control device for an electrically-operated power steering according to one embodiment of the present invention is incorporated. The saddle-ride type vehicle 1 (hereinafter, simply referred to as "vehicle") is an ATV (All Terrain Vehicle) which includes left and right front wheels 2 and 3 formed of a low pressure balloon tire having a relatively large diameter at front and rear portions of a small-sized and light-weighted vehicle body for mainly enhancing a traveling function on a terrain.

On a center portion of a vehicle body frame 4, an engine 5 which constitutes a prime mover is mounted. The engine 5 is a water-cooled short-cylinder engine and a layout which arranges an output shaft of the engine 5 along the longitudinal direction of the vehicle 1 is adopted. A propeller shaft 8f which is guided to a front portion from a lower portion of the engine 5 is connected to the front wheels 2 by way of a front speed reduction mechanism 11 on a front lower side of the vehicle body frame 4 so as to transmit power to the front wheels 2. In the same manner, the propeller shaft 8r is connected to the rear wheels 3 by way of a rear speed reduction mechanism 12 on a rear lower side of the vehicle body frame 4 so as to transmit power to the rear wheels 3.

In the engine 5, a throttle body 17 is connected to a rear portion of a cylinder portion 7 which is mounted on a crank case 6 in an erected manner with an air cleaner 18 being connected to a rear portion of the throttle body 17. An exhaust pipe 19 is connected to the cylinder portion 7 and a distal end portion of the exhaust pipe 19 is connected to a muffler 21 arranged in a rear portion of the vehicle body.

A fuel tank 22 is mounted on a center front portion in the vehicle width direction of an upper portion of the vehicle body of the vehicle 1 with a seat 23 being arranged behind the fuel tank 22. A battery 94 is arranged at a lower portion of a rear portion of the seat 23. A recessed portion is formed in a front portion of the fuel tank 22 such that a steering shaft 25 can be vertically extended. A bar-type steering handle 24 (hereinafter, simply referred to as "handle") is fixed to an upper end portion of the steering shaft 25. An engine-cooling radiator 26 is arranged in front of a lower portion of the steering shaft 25 with a radiator fan 29 being mounted in front of the radiator 26.

A vehicle body cover 31 which covers the front portion of the vehicle body, a front fender 32 which covers upper portions of the front wheels 2, a front protector 33 and a front carrier 34 are mounted on a front portion of the vehicle body frame 4. A rear fender 35 which covers upper portions of the rear wheels 3 and a rear carrier 36 are mounted on a rear portion of the vehicle body frame 4.

Figure 3:
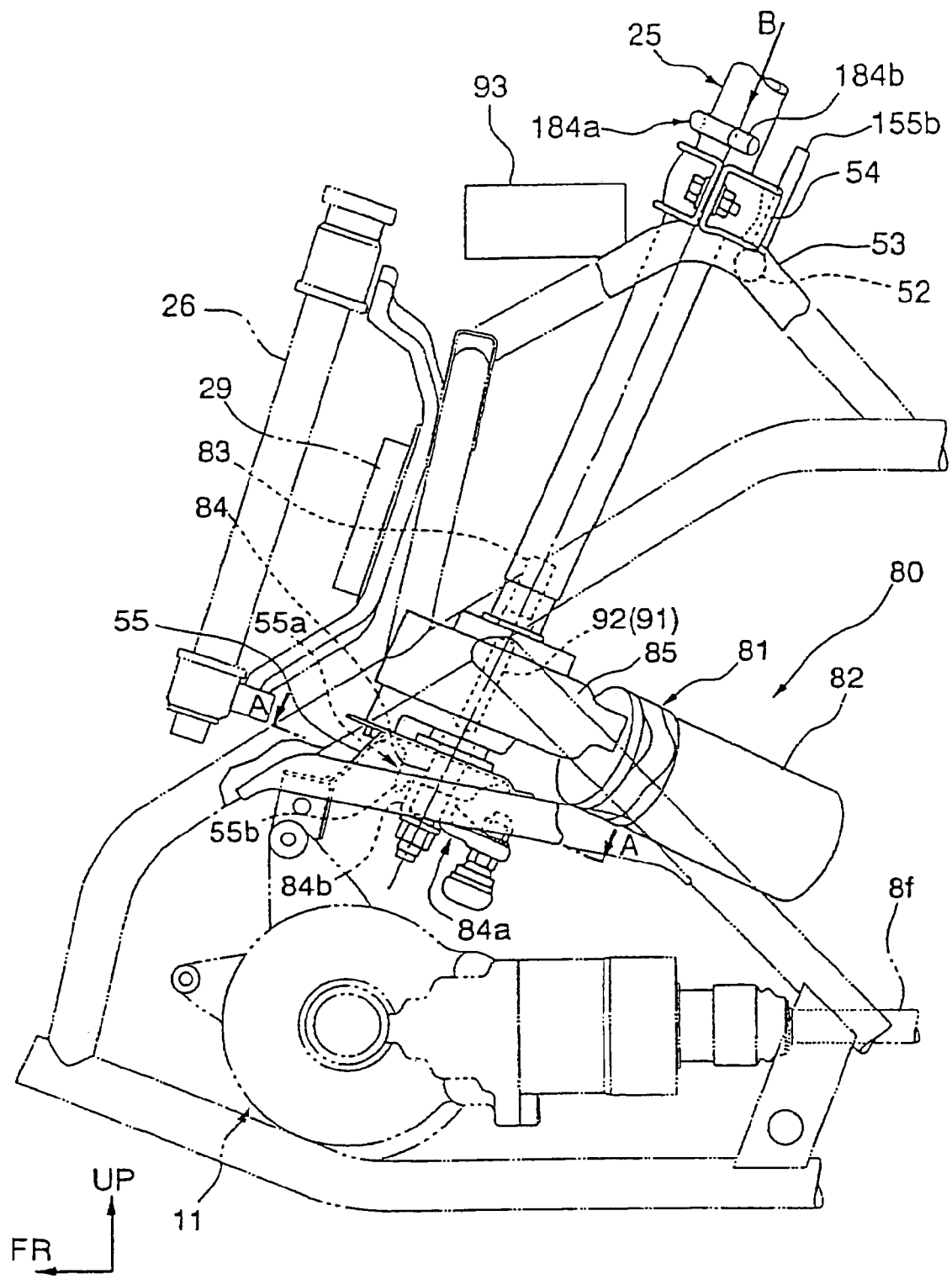
FIG. 3 is an enlarged side view of an essential part in FIG. 2.

The electrically-operated power steering device is explained in conjunction with FIG. 3 along with FIG. 2. FIG. 3 is an enlarged side view of an essential part of FIG. 2 showing the electrically-operated power steering device. An upper portion and a lower end portion of the steering shaft 25 are respectively supported on an upper-portion support bracket 54 and a lower-portion support bracket 55 which are connected to the vehicle body frame 4. The electrically-operated power steering device 80 is formed of an actuator unit 81 which is mounted on an intermediate portion of the steering shaft 25 and a control unit 93 which constitutes an ECU for performing a drive control of a power assist motor 82 which is integrally formed with the actuator unit 81. The power assist motor 82 is subjected to the drive control based on a detected value of a torque sensor 91 which constitutes a torque detection means arranged in the inside of the actuator unit 81.

A lower end portion of the steering shaft 25 is coaxially connected to an input shaft 83 of the actuator unit 81. At the same time, an output shaft 84 which is arranged coaxially with the input shaft 83 and the steering shaft 25 is supported on the lower-portion support bracket 55 by way of a bearing 55a. The input shaft 83 and the output shaft 84 are connected to each other by way of a torsion bar 92 which constitutes one portion of the torque sensor 91 in the inside of a housing 85 of the actuator unit 81.

Since the ground resistance acts on the front wheel 2, when the handle 24 is manipulated in the clockwise direction or in the counterclockwise direction, a relative rotational force is generated between the input shaft 83 which is mechanically connected to the handle 24 and the output shaft 84 which is mechanically connected to the front wheel 2. As a result, the torsion bar 92 is twisted. Thus, a steering torque of the handle 24 is detected based on a twisting amount. The detected value of the steering torque is inputted to a control unit 93 and the power assist motor 82 is subjected to the drive control in response to the detected value.

Due to such a construction, in rotationally manipulating the handle 24, in addition to a manipulation force from the handle 24, a rotation auxiliary force from the power assist motor 82 is imparted to a steering mechanism including the steering shaft 25 (output shaft 84). Thus, a manipulation quantity of the handle 24 is relatively reduced.

Figure 4:
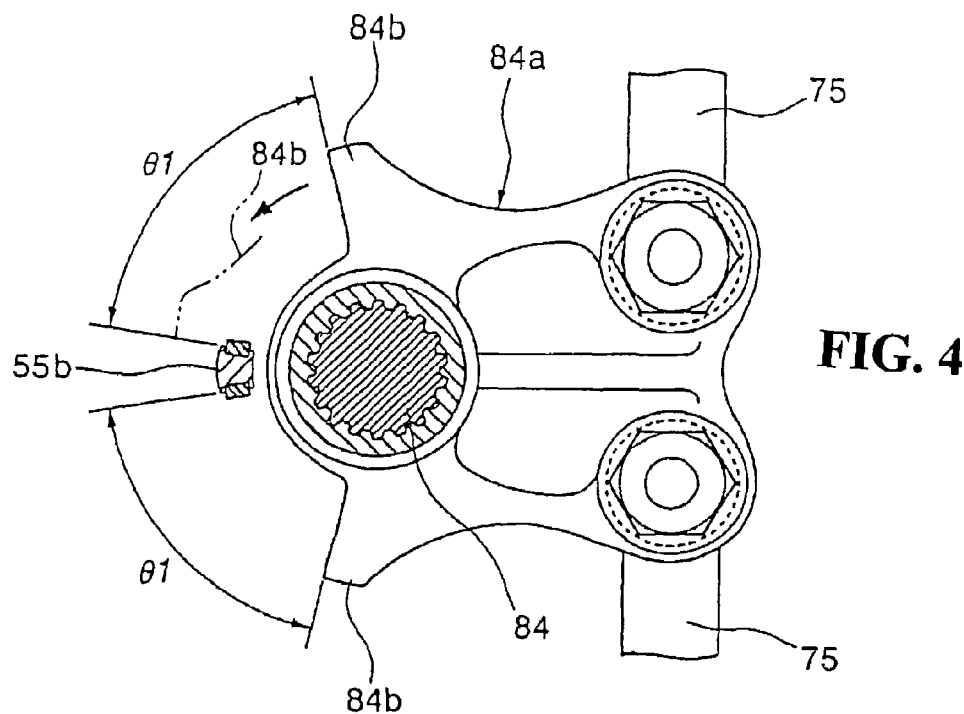
FIG. 4 is a cross-sectional view taken along a line A-A in FIG. 3.

FIG. 4 is an enlarged cross-sectional view of the surrounding of the output shaft 84. In FIG. 4, a pair of left and right tie rods 75 extends in the vehicle body width direction of the vehicle 1 and is respectively connected to the left and right front wheels 2. End portions of the tie rods 75 (end portions opposite to the side on which the front wheel 2 are connected to the tie rods 75) are connected to a pitman arm 84a at a central portion in the vehicle body width direction. The pitman arm 84a is fitted on the output shaft 84 by spline fitting.

The pitman arm 84a is positioned directly below the lower-portion support bracket 55, and the pitman arm 84a and the bearing 55a constitute a handle stopper which defines maximum steering positions in the clockwise direction and in the counterclockwise direction of the steering shaft 25, that is, the handle 24. More specifically, a stopper body 55b is formed on a lower side of the bearing 55a in a projecting manner and, at the same time, contact portions 84b are respectively formed on left and right front surfaces of the pitman arm 84a. When the handle 24 is rotated by a predetermined angle θ1 in the clockwise direction or in the counterclockwise direction from a state in which the steering angle is 0 degree, that is, a state in which vehicle advances in a straight direction, the direct contact portion 84b is brought into direct contact with a side portion of the stopper body 55b to assume the maximum steering state in which the further handle manipulation is limited. Maximum steering switches 10 which constitute maximum steering detection means are respectively formed on side portions of the stopper body 55b.

Figure 5:
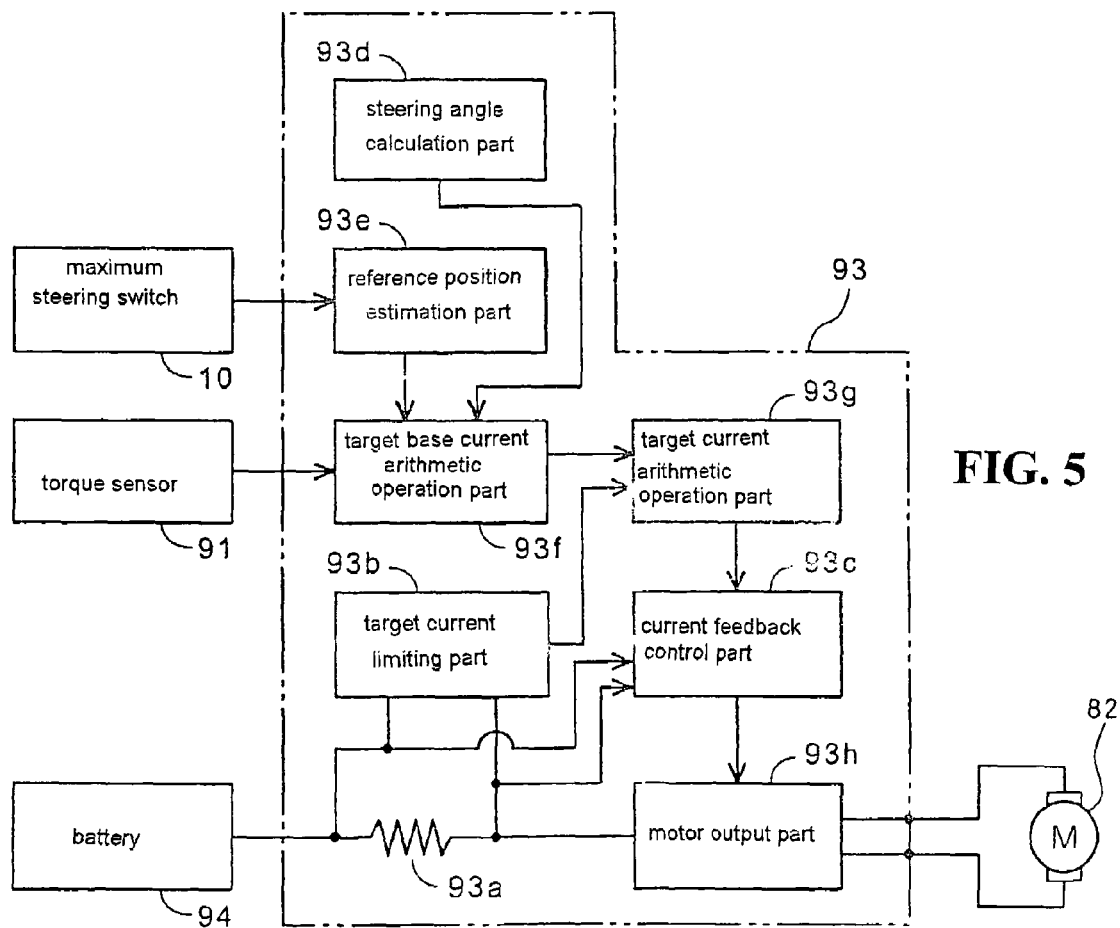
FIG. 5 is a block diagram showing the functions of the essential parts of the electrically-operated power steering control device.

FIG. 5 is a block diagram showing essential functions of the control device for the electrically-operated power steering. A control unit 93 detects a steering angle of the steering shaft 25 based on a maximum steering detection signal which is inputted from the maximum steering switch 10 and values of voltages and currents which are supplied to the power assist motor 82 and, at the same time, the control unit 93 controls the steering auxiliary force applied to the steering shaft 25 based on the detected steering angle.

The control unit 93 includes a steering angle calculation part 93d which calculates a relative steering angle (steering angle from an arbitrary position) of the steering shaft 25 and a reference position estimation part 93e which estimates a steering reference position (steering reference state with respect to the vehicle body) of the steering shaft 25 based on the maximum steering detection signal.

A target base current arithmetic operation part 93f calculates a target base current value which is a motor current value that becomes a basis of the steering auxiliary force based on a detection torque by the torque sensor 91 and an absolute steering angle (relative steering angle from a steering reference position) of the steering shaft 25 which is obtainable from the relative steering angle and the steering reference position. To decide the target base current value, it is favorable to add a vehicle speed to the parameters.

A target current arithmetic operation part 93g decides a target current value by adding an inertia correction and a damper correction to the target base current value. The inertia correction corrects the target current value using a changing value of the torque as a parameter. In taking motor inertia into consideration, a feeling of weight which a driver perceives by way of the handle 24 at the time of starting the steering is enhanced. Thus, it is possible to enhance the feeling of the steering. The damper correction corrects the target current value using a rotational speed of the power assist motor 82 as a parameter. The correction value is set in the direction that the target current value is decreased along with the increase of the rotational speed. The steering feeling can be improved by ensuring the proper response of the handle 24.

An electrically-operated power steering control device further includes a current sensor 93a for detecting a current supplied to the power assist motor 82, wherein a detected current value is inputted to the target current control part 93b and the current feedback control part 93c.

A target current value of the power assist motor 82 is limited to a target current upper limit value by the target current control part 93b for protecting the motor from overheating. The target current control part 93b calculates a temperature of the power assist motor 82 using a calculation formula described later based on a current supplied to the power assist motor 82 and decides the target current upper limit in response to the temperature.

A current from the battery 94 is supplied to the power assist motor 82 by way of a motor output part 93h, that is, a motor driver. The motor output part 93h is an FET bridge circuit and changes a current value supplied to the power assist motor 82 in response to an inputted ON-duty instruction value. The current feedback control part 93c decides the duty instruction value such that the current value detected by the current sensor 93a is converged to the target current value and inputs the duty instruction value into the motor output part 93h.

In this manner, the power assist motor 82 is subjected to the drive control by taking not only the steering torque detection signal from the torque sensor 91 but also the absolute steering angle of the steering shaft 25 into consideration. Thus, it is possible to perform a fine control such that, for example, the steering auxiliary force can be changed between when the handle 24 is turned off from the vehicle straight advance position and when the handle 24 is returned to the vehicle advance position. Further, the upper limit value of the current supplied to the power assist motor 82 is decided based on the estimated temperature of the power assist motor 82, and when the estimated temperature exceeds a preset overheat protection temperature, the steering auxiliary force is reduced or set to zero thus protecting the power assist motor 82 from overheat.

A temperature estimation method of the power assist motor 82 which is executed in the target current control part 93b is explained in contrast with the related art.

The temperature of the power assist motor 82 is estimated based on a cumulative value which is obtained by cumulating the difference between a heating value and a radiating value. As has been explained with respect to the formula (2) in the paragraph of "Description of Background Art," conventionally, the radiating value is set as the constant a. Thus, it is considered that a fixed quantity of heat is radiated irrespective of whether electricity is supplied or not. In this case, since the constant a is an extremely small value, in a traveling state in which the supply of the electricity is continued, the cumulative value T corresponding to the temperature is hardly reduced and tends to be elevated continuously. Accordingly, there exists a possibility that the target current value is limited in a short period. Thus, the steering auxiliary force is not generated.

Figure 6:
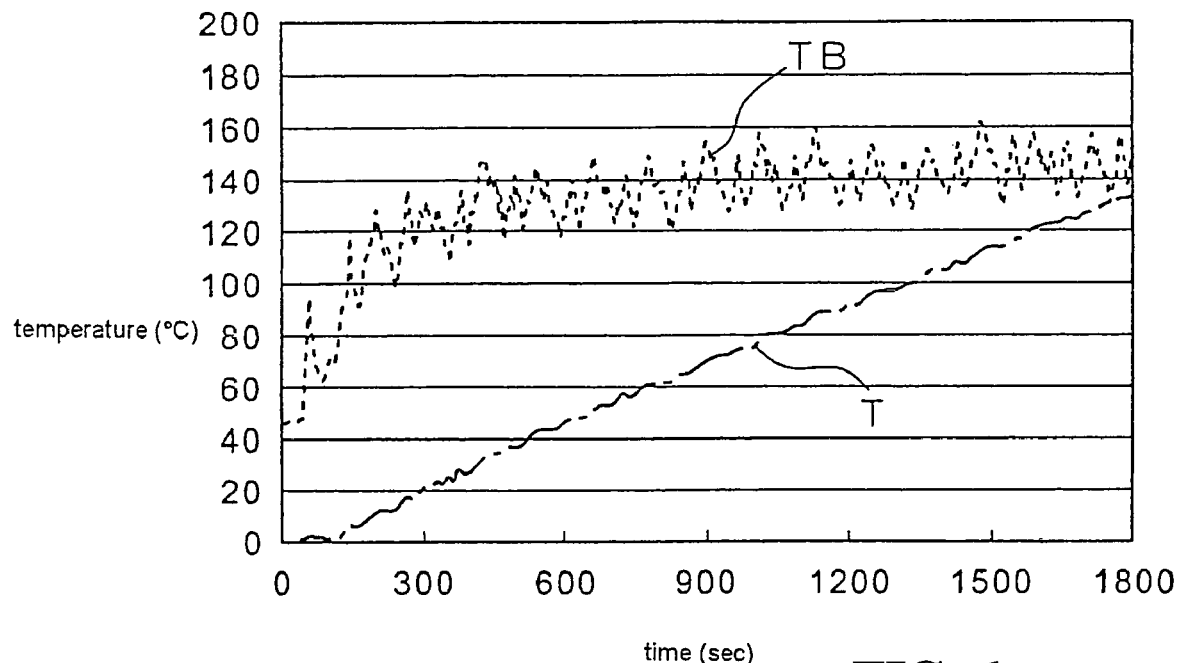
FIG. 6 is a view showing a cumulative value T which is a motor temperature simulation result with an actually measured temperature TB of a brush portion of a power assist motor under an off-road traveling condition.

However, in an actual operation, for example, in the off-road traveling in which a return manipulation of the handle 24 is frequently performed, due to the repetition of heating and radiation, the temperature subsequently assumes equilibrium. FIG. 6 is a graph showing the cumulative value T which is calculated based on the formula (2) under the off-road traveling condition and a measured temperature TB of the power assist motor 82 at a brush portion. As shown in the drawing, although the cumulative value T is elevated continuously, the actually measured temperature TB reaches the equilibrium at approximately 140°. When the cumulative value T is elevated continuously, in spite of the fact that the actually measured temperature TB reaches the equilibrium, the temperature represented by the cumulative value T exceeds the limit temperature of the target current value. Thus, the upper limit of the target current value is limited whereby the imparting of the steering auxiliary force is stopped.

Figure 7:
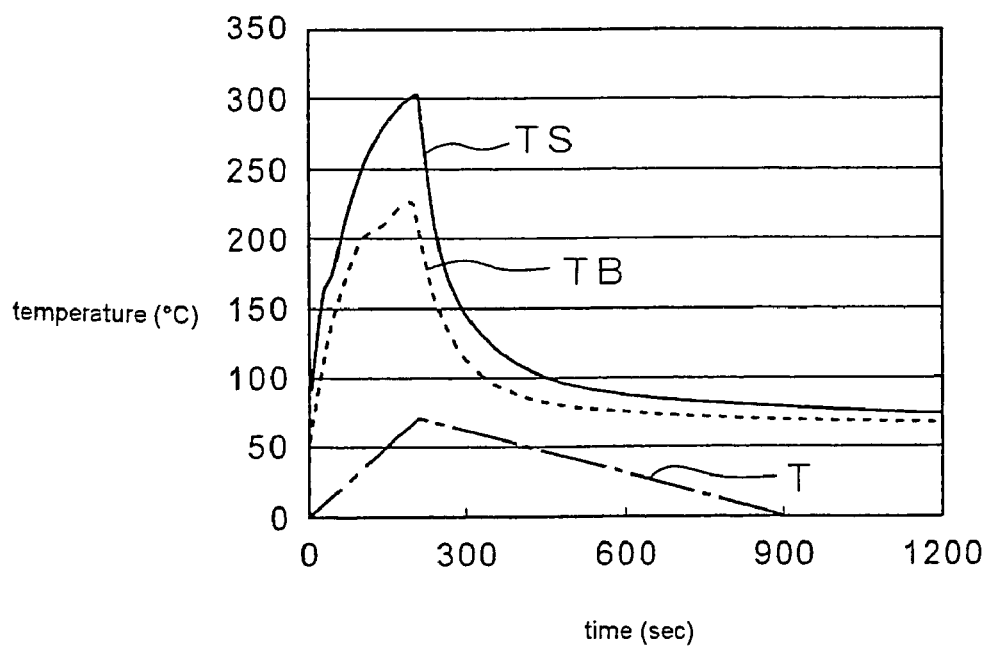
FIG. 7 is a view showing a temperature change of the power assist motor during the supply of electricity and after stopping the supply of electricity.

Accordingly, to allow the calculated value to represent the actual temperature of the power assist motor 82, the modification of the formula (2) is studied. First of all, FIG. 7 shows the temperature change of the power assist motor 82 at the time of supplying electricity and after stopping the supply of electricity. In FIG. 7, a line TB indicates a measurement result of the actually measured temperature TB of the power assist motor 82 at a brush of the motor. A line T indicates a temperature simulation result of a cumulative value T according to the formula (2) and a line TS indicates a temperature simulation result based on a cumulative value TS based on a formula described later obtained by modifying the formula (2). As indicated by the line TB, the actually measured temperature TB is elevated up to approximately 200° C. with a steep gradient with the supply of electricity and, thereafter, the degree of elevation becomes gentle and tends to assume an equilibrium state. Then, when the supply of electricity is stopped at a point in time wherein an electricity supply time of 200 seconds lapses, the heat is sharply radiated and the temperature of the motor is lowered. However, the degree of lowering of temperature becomes gentle immediately and the temperature is lowered along an asymptote with respect to the temperature at the time of starting the operation of the motor.

On the other hand, according to a temperature simulation result based on the cumulative value T using the formula (2), the temperature is linearly increased from the start of the supply of electricity and the temperature is lowered linearly when the supply of electricity is stopped. The reason that such a phenomenon takes place may be considered that while the radiation speed is changed corresponding to the difference between the temperature of the power assist motor 82 and the ambient temperature with respect to the actually measured temperature TB, in the simulation result based on the cumulative value T, the constant a is merely subtracted for every calculation irrespective of the difference between the temperature of the power assist motor 82 and the ambient temperature. Thus, the temperature is linearly lowered.

Accordingly, an estimation formula is set which takes the difference between the temperature of the power assist motor 82 and the ambient temperature into consideration. In setting this estimation formula, the heating coefficient and the radiating coefficient are set such that the simulation temperature for each time exceeds the actually measured temperature TB, that is, the line TS shown in FIG. 7 is obtained in the temperature simulation result based on the cumulative value TS. The estimation formula is as follows.

$$\text{Cumulative value } TS = \quad (3)$$

$$\Sigma((\text{heating coefficient } Kup \times \text{current } I \times I) - (\text{radiating coefficient}$$

$$Kdn \times (\text{preceding-time cumulative temperature } Td -$$

$$\text{ambient temperature } Tm)) + \text{initial temperature } T0$$

The initial temperature T0 and the ambient temperature Tm are default values and both temperatures may be preferably set higher than a maximum value of an expected motor ambient temperature.

Figure 1:
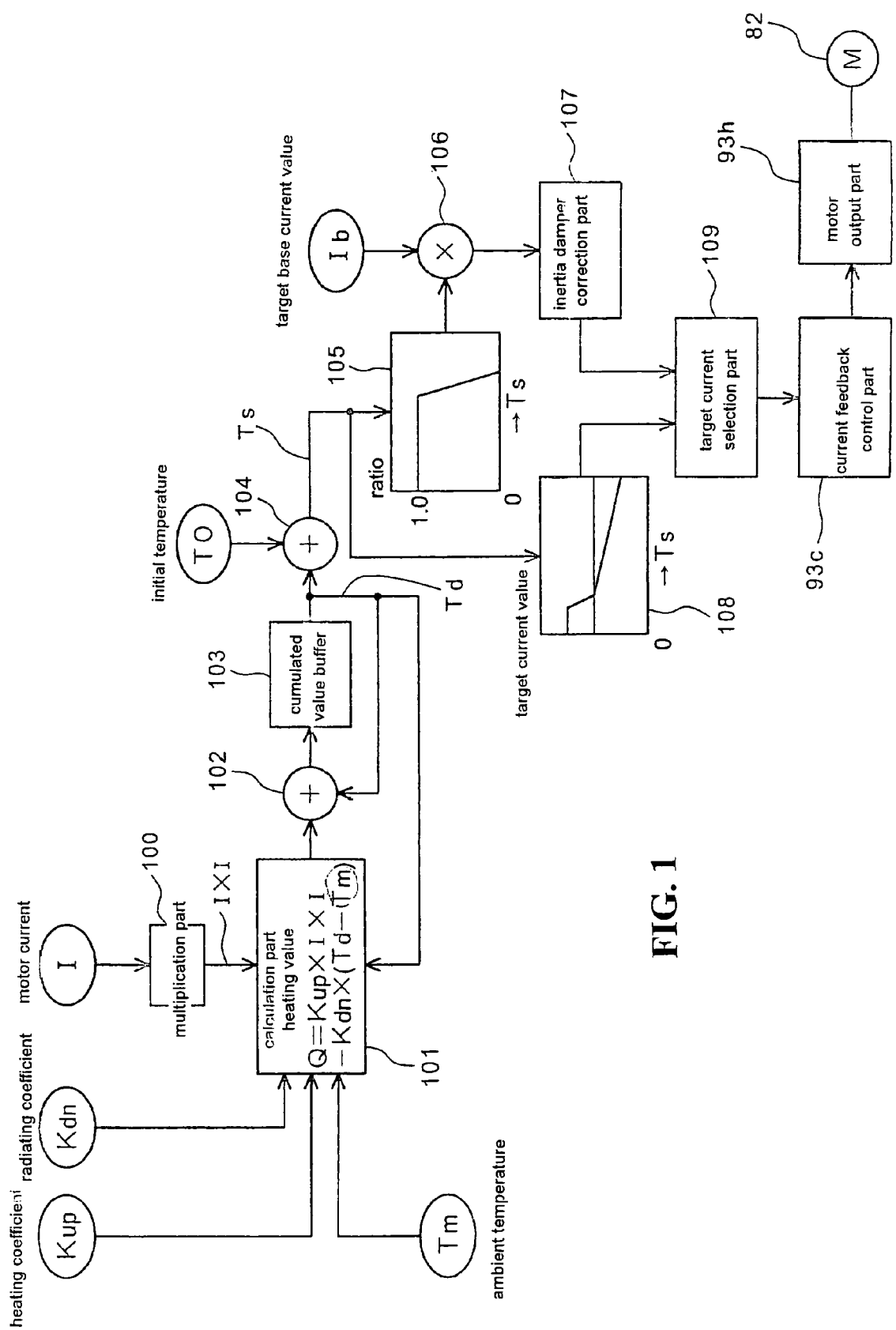
FIG. 1 is a block diagram showing functions of essential parts of a target current control part in the inside of an electrically-operated power steering control device according to one embodiment of the present invention.

FIG. 1 is a block diagram showing functions of essential parts of the target current control part 93b. A current value I which is detected by the current sensor 93a is squared by a multiplication part 100. The squared value of the current value I is inputted to a heating value calculation part 101 together with the heating coefficient Kup and the radiating coefficient Kdn. The ambient temperature Tm is also inputted to the heating value calculation part 101 and the heating value Q is calculated in accordance with a following formula (4).

$$\text{Heating value } Q = Kup \times I \times I - Kdn \times (Td - Tm) \quad (4)$$

The heating value Q is cumulated in an addition part 102 and the cumulated heating value Q is inputted to a cumulated value buffer 103. The cumulative value ΣQ of the heating value Q is fed back to the heating value calculation part 101 as the cumulative temperature Td. The cumulative temperature Td is inputted to an addition part 104 and is added to the initial temperature T0 and the cumulative value TS is outputted from the addition part 104.

In accordance with the cumulative value TS, a target current value to be supplied to the power assist motor 82 is decided. First of all, the cumulative value TS is inputted to a ratio map 105 and a current ratio, that is, a current limiting ratio is decided. The ratio set in the ratio map 105 is set to "1.0" until the cumulative value TS becomes a preset value and becomes "0" in an area in which the cumulative value TS exceeds the preset value. In a multiplication part 106, a target base current value Ib is multiplied with the ratio. When the ratio is equal to or below "1.0," the current value is limited. A target current value outputted from the multiplication part 106, that is, a current value whose target current upper limit value is limited is further corrected by an inertia damper correction part 107 and is outputted from the inertia damper correction part 107.

On the other hand, the cumulative value TS is also inputted to a current upper limit map 108. A target current value corresponding to the cumulative value TS is stored in the current upper limit map 108. The current value is set such that the larger the cumulative value TS, the current value is decreased. A rate of change of the current value differs between an area where the cumulative value TS is small and an area where the cumulative value TS is large. In the area where the cumulative value TS is large, the decreasing rate of the current value is made small compared to the increasing rate of the cumulative value TS.

A target current selection part 109 compares the current value read from the current upper limit map 108 and the current value outputted from the inertia damper correction part 107. Here, the smaller current value is adopted as the target current value of the power assist motor 82 and is inputted into the current feedback control part 93c.

Next, a modification of the temperature estimating method of the power assist motor 82 is explained. In the above-mentioned embodiment, the ambient temperature Tm is set as the fixed value. However, to assume a space in which heat tends to be easily accumulated, that is, a space which has a large heat mass, it may give rise to drawbacks when the ambient temperature Tm is set to the fixed value. Accordingly, in this modification, the ambient temperature Tm is obtained by a formula (5).

$$\text{Ambient temperature } Tm = \quad (5)$$
$$\Sigma((\text{heating coefficient } Kup2 \times \text{current } I \times \text{current } I) -$$
$$(\text{radiating coefficient } Kdn2 \times$$
$$(\text{preceding-time ambient temperature } Tm -$$
$$\text{ambient temperature } Tm0))) + \text{initial temperature } T0$$

Although this formula (5) differs from the formula (3) with respect to the coefficients, the formula (5) is configured in the same manner as the formula (3).

Further, when the heat mass is small, that is, when the surrounding of the power assist motor 82 is a relatively open space, the ambient temperature Tm can be approximately calculated by a formula (6).

$$\text{Ambient temperature } Tm = \Sigma((\text{heating coefficient}$$
$$Kup2 \times \text{current } I \times \text{current } I - a) \quad (6)$$

The formula (6) is a simplified formula in which the radiating value is set to the constant a.

Which one of the formula (5) and the formula (6) is used as the calculation formula of the ambient temperature Tm may be decided corresponding to a state of a space which surrounds the power assist motor 82 (whether the space is large or small or whether heat generating parts are large or small around the power assist motor 82).

The above-mentioned embodiment has been explained in conjunction with the example in which the present invention is applied to the power steering device. However, the motor protective device of the present invention is not limited to the protection of the motor for the power steering device and may be widely applicable to a system which includes a means which estimates a motor temperature by cumulating the difference between the heating value and the radiating value and protects the motor from overheat based on the estimated temperature.

Further, the present invention can perform not only the protection of motor from overheating but also, when the motor supply current is decided based on an ON-duty indication value of a motor driver, protect the motor driver from overheating by limiting the upper limit value of the current.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor protective device comprising:

a motor;

a motor driver for controlling an electric current I supplied to the motor;

a temperature estimation means for estimating a temperature of the motor based on the electric current I supplied to the motor; and an overheating protective means for limiting an upper limit of the motor supply current in response to the estimated temperature of the motor, wherein the temperature estimation means includes a heating value cumulative means which cumulates the difference between a heating value and a radiating value of the motor attributed to the electric current I supplied to the motor along with a lapse of time and, at the same time, the radiating value is a function of the difference between a heating-value cumulative value Td calculated by the heating value cumulative means and an ambient temperature Tm, wherein the heating value is calculated as a multiplied value of a square of the electric current I supplied to the motor and a preset heating coefficient Kup, the radiating value is calculated as a multiplied value of the difference between the heating-value cumulative value Td and the ambient temperature Tm and a preset radiating coefficient Kdn and, at the same time, the heating coefficient Kup and the radiating coefficient Kdn are set such that a cumulative simulation temperature TS is set by the formula:

Cumulative Simulation Temperature $TS$=(the heating value−radiating value)+(an actually measured temperature $T0$ of the motor which is measured preliminarily).

2. The motor protective device according to claim 1, wherein the ambient temperature is a preset fixed value.

3. The motor protective device according to claim 1, wherein the ambient temperature is set as a function of the heating-value cumulative value obtained by cumulating the difference between the heating value and the radiating value of the motor along with a lapse of time, and a second heating coefficient and a second radiating coefficient are multiplied to the heating value and the radiating value apart from the heating coefficient and the radiating coefficient.

4. The motor protective device according to claim 3, wherein the radiating value of the motor is a preset fixed value in setting the ambient temperature.

5. The motor protective device according to claim 1, wherein the motor is a motor for a power steering device which imparts a steering auxiliary force corresponding to a torque which acts on a steering shaft to the steering shaft, and the motor driver is configured to control the steering auxiliary force by changing the motor supply current corresponding to a magnitude of the torque.

6. The motor protective device according to claim 2, wherein the motor is a motor for a power steering device which imparts a steering auxiliary force corresponding to a torque which acts on a steering shaft to the steering shaft, and the motor driver is configured to control the steering auxiliary force by changing the motor supply current corresponding to a magnitude of the torque.

7. The motor protective device according to claim 3, wherein the motor is a motor for a power steering device which imparts a steering auxiliary force corresponding to a torque which acts on a steering shaft to the steering shaft, and the motor driver is configured to control the steering auxiliary force by changing the motor supply current corresponding to a magnitude of the torque.

8. The motor protective device according to claim 4, wherein the motor is a motor for a power steering device which imparts a steering auxiliary force corresponding to a torque which acts on a steering shaft to the steering shaft, and the motor driver is configured to control the steering auxiliary force by changing the motor supply current corresponding to a magnitude of the torque.

9. A motor protective device comprising:
a motor;
a motor driver for controlling an electric current supplied to the motor;
a temperature estimation means for estimating a temperature of the motor based on the electric current supplied to the motor; and
an overheating protective means for limiting an upper limit of the motor supply current in response to the estimated temperature of the motor, wherein
the temperature estimation means includes a heating value cumulative means which cumulates the difference between a heating value and a radiating value of the motor attributed to the supply current along with a lapse of time and, at the same time, the radiating value is a function of the difference between a heating-value cumulative value calculated by the heating value cumulative means and an ambient temperature according to the formula:

Cumulative value $TS$=Σ((heating coefficient $Kup$× current $I$×$I$)−(radiating coefficient $Kdn$×(preceding-time cumulative temperature $Td$−ambient temperature $Tm$))+initial temperature $T0$, wherein TS is the cumulative values,
Td is the cumulative temperature,
Tm is the ambient temperatures, and
T0 is the initial temperature.

10. The motor protective device according to claim 9, wherein the heating value is calculated as a multiplied value of the motor supply current value and a preset heating coefficient, the radiating value is calculated as a multiplied value of the difference between the heating-value cumulative value and an ambient temperature and a preset radiating coefficient and, at the same time, the heating coefficient and the radiating coefficient are set such that the heating-value cumulative value becomes higher than an actually measured temperature of the motor which is measured preliminarily.

11. The motor protective device according to claim 9, wherein the ambient temperature is a preset fixed value.

12. The motor protective device according to claim 9, wherein the ambient temperature is set as a function of the heating-value cumulative value obtained by cumulating the difference between the heating value and the radiating value of the motor along with a lapse of time, and a second heating coefficient and a second radiating coefficient are multiplied to the heating value and the radiating value apart from the heating coefficient and the radiating coefficient.

\* \* \* \* \*